United States Patent [19]

Prukop

[11] Patent Number: 4,982,789
[45] Date of Patent: Jan. 8, 1991

[54] METHOD OF USING UREA AS A SACRIFICIAL AGENT FOR SURFACTANTS IN ENHANCED OIL RECOVERY

[75] Inventor: Gabriel Prukop, Houston, Tex.

[73] Assignee: Texaco Inc., White Plains, N.Y.

[21] Appl. No.: 465,680

[22] Filed: Jan. 16, 1990

[51] Int. Cl.⁵ .................... E21B 43/22; E21B 43/24
[52] U.S. Cl. .................................. 166/272; 166/274; 166/275; 166/303; 166/305.1; 252/8.554
[58] Field of Search ............... 166/272, 273, 274, 275, 166/288, 303, 305.1; 252/8.554

[56] References Cited

U.S. PATENT DOCUMENTS 3,414,053 12/1968 Treiber et al. ...................... 166/273
3,777,817 12/1973 Feuerbacher et al. ......... 166/273 X
4,482,015 11/1984 Falk ................... 166/295 X
4,493,370 1/1985 Stapp et al. ................ 166/273
4,572,296 2/1986 Watkins ........................... 166/303
4,732,213 3/1988 Bennett et al. ................ 166/275 X Primary Examiner—George A. Suchfield
Attorney, Agent, or Firm—Jack H. Park; Kenneth R. Priem; Harold J. Delhommer

[57] ABSTRACT

The disclosed invention is a method of injecting a solution or emulsion containing about 0.05% to about 10% by weight of urea as a sacrificial agent for surfactants into an underground formation in enhanced oil recovery operations, said underground formation having a temperature greater than about 130° F.

9 Claims, No Drawings

METHOD OF USING UREA AS A SACRIFICIAL AGENT FOR SURFACTANTS IN ENHANCED OIL RECOVERY

BACKGROUND OF THE INVENTION

This invention relates to a method of injecting chemicals into a hydrocarbon reservoir for the purpose of increasing hydrocarbon recovery. More particularly, the invention pertains to the use of urea as a sacrificial agent to decrease adsorption of surfactants within hydrocarbon reservoirs.

One of the most vexing problems in the use of surfactant flooding for enhanced oil recovery is the frequent, substantial loss of surfactant due to adsorption on the formation matrix and precipitation by polyvalent cations such as calcium and magnesium. A significant percentage of surfactants are also physically entrapped within the pore spaces of the rock matrix. Of chief concern is surfactant adsorption on the formation matrix which significantly decreases surfactant flood efficiency, making it necessary to inject a greater quantity of surfactant and increasing the cost of any surfactant flood.

Additionally, most surfactants are satisfactory for surfactant flooding only if the calcium and magnesium concentrations of the formation water fall below about 500 ppm. Alkyl or alkylaryl sulfonates, the most popular type of surfactants, precipitate where divalent ion concentrations exceed about 500 ppm. Such precipitation renders the sulfonates inoperative for recovering oil and in some instances, causes formation plugging.

The main cause of surfactant loss is adsorption within the formation due to physical contact of the surfactant with the formation matrix or entrapment within pores of the matrix. Surfactant systems contacting a sandstone matrix encounter a range of adsorptive sites. Although a number of adsorptive sites in sandstone are negatively charged, there are also a number of positively charged sites. For example, the surfaces of clay platelets, which are invariably present in sandstone reservoirs, have negatively charged sites, and the edges of clay platelets frequently have positively charged sites. The presence of small amounts of limestone or dolomite in sandstone will additionally introduce positively charged absorptive sites. Of course, different types of clays will have different adsorptive characteristics.

In addition to the composition of the formation matrix, it is known that the pH of the formation brine and of injected solutions can have a marked effect on adsorption of anionic surfactants. See M. J. Rosen, *Surfactants and Interfacial Phenomena*, John Wiley and Sons, New York, N.Y. (1978) p. 47.

The most promising approach for reducing the amount of surfactants retained by the formation matrix has been to use sacrificial agent compounds, either in a preflush solution injected before the surfactant-containing solution, or in the surfactant solution. The compounds are sacrificial in that their loss to the formation matrix reduces the loss of the more expensive surfactants and solubilizers contained within the surfactant solutions.

Various chemicals have been employed as sacrificial agents to decrease the adsorption of surfactants or to tie up polyvalent cations and prevent them from precipitating surfactants from the flooding medium. Lignosulfonates form one class of compounds which have been found to have excellent properties as sacrificial agents. They are economically attractive because they are by-products of the pulp industry. Supply is plentiful and product costs are much less than the costs of surfactants employed in enhanced oil recovery floods. The use of various lignosulfonates has been disclosed extensively in the literature.

U.S. Pat. No. 4,147,214 discloses the use of synthetic tannin materials as sacrificial agents in surfactant floods. The synthetic tannins may be condensation products of formaldehyde and naphthalene sulfonic acids, various phenols and sulfonated phenols, diaryl sufones, urea, melamine and diamide. U.S. Pat. No. 4,493,370 discloses the use of urea as a cosurfactant with hydrocarbon sulfonates and alcohol in a surfactant system for enhanced oil recovery.

SUMMARY OF THE INVENTION

The disclosed invention is a method of injecting a solution, emulsion or surfactant foam system containing about 0.05% to about 10% by weight of urea as a sacrificial agent into an underground formation in enhanced oil recovery operations. The underground formation must have a temperature greater than about 130° F., a temperature sufficient to hydrolyze the injected urea over time.

The urea solution is injected into the formation to decrease the loss of more costly surfactant and solubilizer to the formation. The invention sacrificial agent system is injected into the hydrocarbon formation in conjunction with a surfactant solution or prior to the injection of the surfactant system.

DETAILED DESCRIPTION

The highly undesirable loss of surfactant in chemical flooding may generally be attributed to two main phenomena. The first phenomenon is chemical removal or inactivation of the surfactant after contact with polyvalent cations or other materials dissolved in the formation fluids. Frequently, the end result is precipitation which leaves less surfactant in solution and lowers formation permeability. The second phenomenon is adsorption within the formation due to physical contact of the surfactant with the formation matrix or entrapment within pores of the matrix. It is believed that both phenomena exist simultaneously to varying degrees in most chemical flooding operations.

It is believed that most sacrificial agents generally work by one or more of several chemical mechanisms. However, it must be emphasized that these chemical mechanisms are theoretical and the extent to which any one of these mechanisms may be responsible for the effectiveness of a sacrificial agent is unknown. One possible sacrificial mechanism is the complexing of the sacrificial agent with polyvalent cations in solution, both by neutral and by charged sacrificial complexing agents. To the extent that the sacrificial agent complexes with polyvalent cations in the formation fluids, there will be less polyvalent cations left for the surfactant to interact with.

A second possible mechanism is the electrostatic attraction of the matrix and the sacrificial agent for each other. This is predominantly controlled by the surface charge at the multitudes of matrix adsorption sites. The electrostatic attraction mechanism is highly dependent upon the composition of the formation matrix. For instance, sandstones which may contain many different types of clays, will have different types of attractions for sacrificial agents and surfactants.

A third possible sacrificial mechanism arises from the fact that polymers have many functional groups and may attach themselves to the rock surface at plural sites, thereby blocking access to other sites on which injected surfactants, solubilizers and polymers could adsorb. In this manner, the large size of polymer molecules may block entrances to very small pores where much of the surface area and many adsorption sites lie.

A fourth sacrificial mechanism is the alteration of formation pH. It is uncertain how pH changes affect the various mechanisms by which surfactant is lost to the formation, but it is known that surfactant adsorption decreases upon increase in pH.

In carrying out the invention sacrificial agent method, an aqueous solution containing about 0.05% to about 10% urea by weight is injected into an underground formation. The underground formation must have a temperature sufficient to substantially hydrolyze the injected urea. This temperature should be at least 130° F. Below this temperature, urea hydrolysis is not significant. More preferably, the temperature of the underground formation will be greater than about 160° F., or most preferably, greater than about 200° F. Urea hydrolysis becomes substantial at about 160° F. and above.

There are numerous hydrocarbon reservoirs which are naturally hot or warm and provide at least the minimum 130° F. needed to practice this invention. One option is to treat a cooler formation by injecting a hot fluid, which may be water, steam or solvent.

Urea hydrolyzes in water according to the following equation.

$$(H_2N)_2CO + 3H_2O \rightarrow CO_2 + 2NH_4^+ + 2OH^-$$

The in situ generation of hydroxyl ion by urea hydrolysis should minimize the high consumption of chemical associated with other methods of increasing pH, such as caustic flooding. Urea hydrolysis should also give more uniform protection of the surfactants in hydrocarbon formations.

Compared to other compounds injected into underground formations during enhanced oil recovery operations, urea is exceptionally inexpensive. Recently, urea has been selling for about 5¢ per pound and has sold for as low as 3.5¢ per pound in recent years. Enhanced oil recovery surfactants cost in the 0.80 to 1.50 dollars per pound range. The price of most enhanced oil recovery polymers is measured in the multiple dollars per pound.

The sacrificial agent system may be coinjected into the subterranean formation in solution, emulsion or surfactant foam system with about 0.1% to about 10% by weight of surfactant, solubilizer, polymer, or mixture thereof. The urea may also be injected as a preflush slug prior to the injection of the surfactant system in an amount of about 0.05% to about 10% by weight, preferably about 0.05% to about 5% by weight. The most preferred system is a urea preflush slug followed by a surfactant slug containing urea, with an optional polymer drive containing urea.

When sacrificial agents are used in a preflush solution and injected prior to the surfactant system, the length of time before oil recovery is increased since the sacrificial agents will not recover any oil. Any extra time imposed by the flooding process before additional oil recovery may reduce the overall economics of the process. In addition, preflushes in general are often not as effective as expected because of conformity problems and large reservoir volumes. There is no assurance that the flow path of the surfactant solution will sufficiently coincide with that of the preflush sacrificial agent solution.

When the sacrificial agent system is injected in a mixture with the surfactant or micellar formulation, it is necessary that the admixture be phase stable. Chromatographic separation complications can be minimized by introducing the sacrificial agent system in both the surfactant slug and in the trailing mobility control polymer slug.

The quantity of sacrificial agent system to be injected should be sufficient to cover substantially all of the active adsorption sites of the formation matrix or prevent adsorption on those sites in order to achieve a maximum reduction in the amount of surfactant loss to the formation. If less than this optimum amount is used, the corresponding reduction and surfactant loss to the formation will not be as great as in the case where the formation adsorption sites were completely saturated. A balance must be struck with the economics of the surfactant flood. Of course, the use of excess sacrificial agent materials will increase the cost of the chemical flood.

The preferred total amount of urea injected will vary with the composition of the formation, the thickness of the formation, the pattern area to be swept and various other formation characteristics. Process design data coupled with field experience can determine the approximate quantity of sacrificial agent system needed for best results. But it should be noted that surfactant losses in the field have been found to be invariably higher than the projected losses from laboratory work. This is particularly so when the formation matrix contains large quantities of clays.

Thus, considerable knowledge of the formation matrix and formation fluids is necessary in order to determine the optimum amount of sacrificial agent system of urea to be injected to achieve the maximum economical reduction in surfactant and polymer loss. If the hydrocarbon formation is relatively clean sandstone lacking substantial clay content, smaller quantities of sacrificial agent may be needed than in the case where the formation contains large amounts of highly absorbent clays.

The effectiveness of using a sacrificial agent system of urea for reducing surfactant, solubilizer and polymer loss in chemical flooding operations is demonstrated by the following examples. These examples are presented for illustrative purposes only and should not be construed to limit the scope of the invention, which is defined in the claims that follow.

EXAMPLES 1-4

Although the producing sands in the Kern River Field are relatively shallow, 200° F. is a typical temperature encountered by an injected solution because of years of steam injection. The hydrolysis of urea occurs rapidly at elevated temperatures such as 200° F.

In Examples 1-4 of Table 1, 0.5% by weight urea was placed in Kern River produced brine (hereafter KRPB) which is relatively fresh water having 828 ppm TDS, and a divalent ion content of 40 mg/l. Sodium chloride was added to the solutions in the amounts indicated in Table 1. The pH of the solutions was measured at the beginning and after 5 days at 200° F. In every case, the hydroxyl ions from the urea hydrolysis raised the pH almost one unit from a beginning pH of about 8.6 to 8.7.

TABLE 1
HYDROLYSIS OF UREA AT 200° F. OVER 5 DAYS

| EXAMPLES | NaCl, % | pH before | pH after |
|---|---|---|---|
| 1 | 1.5 | 8.73 | 9.66 |
| 2 | 2.0 | 8.66 | 9.45 |
| 3 | 2.5 | 8.57 | 9.62 |
| 4 | 3.0 | 8.65 | 9.54 |

EXAMPLES 5–10

Adsorption bottle tests and core floods can be performed in the laboratory which will give a round indication of the performance of sacrificial agent systems in the field. The effectiveness of urea at reducing surfactant adsorption is demonstrated in Examples 5–10 of Table 2. The solutions are the same as in Table 1 with and without urea.

Five grams of 1.5% to 2.5% NaCl in KRPB and five grams of sandstone core material from a Kern River, California hydrocarbon reservoir were employed in the bottle tests. Kern River sandstone is unconsolidated and friable. For these examples, the sandstone was crumbled by hand. In every case, the core material was sieved to a size between 80 and 200 mesh. X-ray mineralogical analysis of several samples of this core material yielded clay compositions of about 14% illite, 86% montmorillonite, and a total clay content of about 11%. The remaining material was quartz and feldspar in approximately equal amounts. All of the above percentage figures are percent by weight.

The surfactants employed in the 2% by weight solution of Examples 5–10 was Aristol B Sulfonate, a trademarked linear alkylbenzene sulfonate averaging about 10%–20% dialkyl with about 16 to 18 carbon atoms in the alkyl chains sold by Pilot Chemical Co.

The adsorption bottle tests were conducted by contacting the crushed core materials with the surfactant and surfactant plus urea solutions for 24 hours at 200° F. This contact was accomplished by gentle tumbling at four rpm. The amount of surfactant adsorbed was determined from the difference between the uncontacted and contacted surfactant concentrations.

TABLE 2
ADSORPTION OF SURFACTANT A 200° F.

| | | Adsorption, % (meq/meq) | |
|---|---|---|---|
| Examples | NaCl, % | 2% Aristol B | 2% Aristol B + 0.5% UREA |
| 5–6 | 1.5 | 99.9 | 0.0 |
| 7–8 | 2.0 | 99.9 | 0.0 |
| 9–10 | 2.5 | 99.8 | 0.0 |

EXAMPLES 11–14

The benefits of using urea as a sacrificial agent in surfactant/polymer enhanced oil recover systems was dramatically demonstrated in corefloods which used sand, oil and water from the California Kern River Field. These floods, conducted at 250° F., were composed of a thorough waterflood, a 0.25 pore volume of 2.5% salt preflush, a 0.25 pore volume of 2% surfactant slug, and a final polymer drive solution. Table 3 below summarizes the results.

TABLE 3
SURFACTANT COREFLOODS WITH UREA AT 250° F.

| Examples | Surfactant Solution[1] | Residual Oil Saturation, % To Water | Residual Oil Saturation, % To Surfactant | Recovery Efficiency, % |
|---|---|---|---|---|
| 11 | 2% Aristol B | 36 | 19 | 48 |
| 12 | 2% Aristol B + 1% Urea | 37 | 14 | 63 |
| 13 | 2% Aristol B/ Polymer/Oil | 33 | 14 | 58 |
| 14 | 2% Aristol B/ Polymer/Oil + Urea[2] | 27 | 6 | 79 |

[1] All floods included 0.25 pore volumes of salt preflush, 0.25 pore volumes of surfactant solution, and were pushed with a polymer solution.
[2] 1% urea was used in the preflush. The surfactant and polymer solutions contained 0.1% urea.

In the linear coreflood of Example 11, a surfactant solution recovered 48% of the oil left after waterflooding. When 1% urea was incorporated in the surfactant slug of Example 12, a similar coreflood, the recovery efficiency dramatically jumped to 63%.

In the two radial sandpack floods of Examples 13 and 14, the surfactant slug was formulated with added polymer and a paraffinic wax to increase its viscosity and stability. The Example 13 flood without urea recovered 57.5% of the waterflood residual oil. When the coreflood was revised in Example 14 to include 1% urea in the preflush slug and 0.1% urea in the surfactant and polymer slugs, the recovery efficiency substantially increased to 79.1%.

The dramatic improvement in oil recovery with added urea is due to the ability of the urea to minimize the loss of both surfactant and polymer. Detailed information on each of these four corefloods follows.

EXAMPLE 11

Example 11 was a linear coreflood performed with surfactant and polymer slugs without added urea. The surfactant employed was the Aristol B sulfonate in a 2% solution. The polymer was Cyanatrol 740, a trademarked polyacrylamide in a granular form having a molecular weight of about 9–10 million sold by American Cyanamid.

The core was packed with Kern River sand with a hydraulic press at 1500–1600 psi. It was initially cleaned with a mixture of 75% xylene and 25% methanol. A pentane slug was injected behind the cleaning slug until the produced fluid came out clear. Nitrogen was injected overnight to clean out the pentane. A vacuum was pulled on the core and the core weighed. The core was resaturated with KRPB and weighed to yield porosity and pore volume values. The core was 30.5 cm long with a diameter of 3.8 cm. The pore volume was 144 ml, porosity was 41.4% and permeability was 2217 md.

Heat was applied to raise the core temperature to 250° F. with a back pressure regulator set at 50 psi. KRPB was heated and flowed overnight through the core at 250° F. The core was then saturated with a stock tank oil from Kern River having an API gravity of about 13.6°. A waterflood was undertaken with KRPB to reduce the core to residual oil saturation to water. This completed the preparation of the core for the coreflood.

A preflush slug of 2.5% added sodium chloride in KRPB was injected for 0.25 pore volumes. This was followed with a 0.25 pore volume surfactant slug of 2% by weight Aristol B Sulfonate in 2.5% added sodium chloride in KRPB. The surfactant slug was heated and stirred during injection. A polymer drive of 1750 ppm Cyanatrol 740 in KRPB was injected continuously until zero oil was produced.

Initial oil saturation was 60%, residual oil saturation to water was 36%, residual oil saturation after surfactant flood was 19%, yielding a recovery efficiency of 48%.

EXAMPLE 12

The Example 12 core with 1% by weight urea in the surfactant slug was prepared for flooding in exactly the same way as Example 11, except that the core was initially packed at 2500 psi. The porosity of the core was 39% and the permeability was 1247 md.

Initial oil saturation was 61%, residual oil saturation to water was 37%, and residual oil saturation after surfactant flood was 14%, yielding an improved recovery efficiency of 63%.

EXAMPLE 13

A radial sandpack flood was conducted on a rectangular quarter section of core which measured 15.24 cm by 15.24 cm by 5.08 cm thick. This rectangular section represents one-quarter of a standard five-spot pattern. The core was handpacked with Kern River sand crumbled to a size between 20 and 100 mesh. The core was then prepared for flooding in the same fashion as Example 11, including heating to 250° F. The core had a porosity of 46.8% and permeability of 2530 md.

The 0.25 pore volume preflush slug contained 1500 ppm of RC-470H, a trademarked AMPS homopolymer with a molecular weight of about 6–8 million sold by American Cyanamid. AMPS is an abbreviation for 2-acrylamido-2-methylpropane sulfonate monomer. It is a very stable high temperature polymer. The preflush also contained 2.5% by weight sodium chloride added to KRPB. A 0.25 pore volume surfactant slug was injected at 250° F. containing 2% by weight Aristol B Sulfonate, 2500 ppm RC-470H, 3.5% Wax H-40 and 2.5% sodium chloride added to KRPB. The Wax H-40 was a refinery paraffinic wax by-product having a melting point of about 140° F.

The polymer slug was 1500 ppm RC-470H in KRPB. The polymer was injected continuously until zero additional oil was produced, for a total of 1.86 pore volumes of polymer. The viscosity of the polymer slug was 22.2 cp at 23° C. and 23 sec$^{-1}$.

Initial oil saturation was 61.6%, residual oil saturation to water was 32.6%, and residual oil saturation to surfactant flood was 13.9%, yielding a recovery efficiency of 57.5%.

EXAMPLE 14

The core of Example 14 was a radial section of Kern River sand prepared in the same fashion as Example 13. Porosity of the core was 47.5% and permeability was 656 md. The only significant differences of Example 14 over the coreflood of Example 13 were a different polymer, 1% urea in the preflush, and 0.1% urea in the surfactant slug.

The 0.25 pore volume preflush contained 1500 ppm of Cyanatrol 740, 1% by weight urea, and 2.5% sodium chloride added to KRPB. The 0.25% pore volume surfactant slug contained 0.1% urea, 2% Aristol B Sulfonate, 2500 ppm Cyanatrol 740, 3.5% wax H-40, and 2.5% sodium chloride added to KRPB. The pH of the surfactant slug was 8.06.

The polymer slug contained 1750 ppm Cyanatrol 740 in KRPB with 0.1% urea added. The viscosity of the polymer slug was 49.8 cp at 23° C. and 23 sec$^{-1}$. The viscosity at 90° C. and 7.34 sec$^{-1}$ was 62.5 cp. 1.99 pore volumes of polymer slug was injected before the end of the flood.

Initial oil saturation was 59.1%, residual oil saturation to water 27.1%, and residual oil saturation to surfactant flooding was 5.7%, yielding a dramatic increase in recovery efficiency to 79.1%.

Many other variations and modifications may be made in the concepts described by those skilled in the art without departing from the concepts of the present invention. Accordingly, it should be clearly understood that the concepts disclosed in the description are illustrative only and are not intended as limitations on the scope of the invention.

What is claimed is:

1. A sacrificial agent method for reducing the loss of surfactants to an underground formation in enhanced oil recovery operations, which comprises:

injecting an aqueous solution of about 0.05% to about 10% urea by weight into an underground formation to reduce the loss of surfactant to the underground formation, said underground formation having a temperature greater than about 130° F. to hydrolyze the injected urea.

2. The method of claim 1, wherein the temperature of the underground formation is greater than about 160° F.

3. The method of claim 1, wherein the temperature of the underground formation is greater than about 200° F.

4. The method of claim 1, wherein the solution contains about 0.05% to about 5% urea by weight.

5. The method of claim 1, wherein the urea solution is injected as a preflush prior to the injection of a surfactant slug.

6. The method of claim 5, further comprising injecting a solution comprising about 0.05% to about 5% urea by weight and about 0.1% to about 10% surfactant by weight after the injection of the urea preflush solution.

7. The method of claim 1, wherein the solution further comprises about 0.1% to about 10% by weight of surfactant, solubilizer, polymer, or mixture thereof.

8. The method of claim 1, wherein the formation temperature has been increased by the injection of hot fluids.

9. A sacrificial agent method for reducing the loss of surfactants to an underground formation in enhanced oil recovery operations, which comprises:

injecting an aqueous solution of about 5% to about 10% urea by weight to reduce the loss of surfactant to the underground formation and about 0.5% to about 5% by weight of surfactant, solubilizer or mixture thereof into an underground formation, said underground formation having a temperature greater than about 160° F. to hydrolyze the injected urea.

* * * * *

UNITED STATES PATENT AND TRADEMARK OFFICE
CERTIFICATE OF CORRECTION

PATENT NO. : 4,982,789
DATED : January 8, 1991
INVENTOR(S) : Gabriel (NMN) Prukop It is certified that error appears in the above-identified patent and that said Letters Patent is hereby corrected as shown below:

In Col. 7, line 33, please delete "AMPS".

In Col. 7, line 34, please substitute --furnished-- for "sold".

In Col. 7, line 35, after "Cyanamid", please insert --made from an AMPS® monomer--.

In Col. 7, line 35, please substitute --AMPS® is a registered trademark of The Lubrizol Corporation-- for "AMPS is an abbreviation".

Signed and Sealed this

Ninth Day of March, 1993

*Attest:*

STEPHEN G. KUNIN

*Attesting Officer*     *Acting Commissioner of Patents and Trademarks*